(12) United States Patent
Kamen et al.

(10) Patent No.: US 7,062,756 B2
(45) Date of Patent: Jun. 13, 2006

(54) DYNAMIC OBJECT USAGE PATTERN LEARNING AND EFFICIENT CACHING

(75) Inventors: Yury Kamen, Foster City, CA (US); Robert N. Goldberg, Emerald Hills, CA (US); Bruce K. Daniels, Capitola, CA (US); Syed M. Ali, Sunnyvale, CA (US); Peter A. Yared, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 599 days.

(21) Appl. No.: 09/998,035

(22) Filed: Nov. 30, 2001

(65) Prior Publication Data

US 2003/0105857 A1    Jun. 5, 2003

(51) Int. Cl.
*G06F 9/44* (2006.01)
(52) U.S. Cl. ...................... 717/127; 717/154
(58) Field of Classification Search ............... 717/141, 717/158, 159, 161, 104, 127, 154
See application file for complete search history.

(56) References Cited

U.S. PATENT DOCUMENTS

| 5,539,893 | A | * | 7/1996 | Thompson et al. | ......... 711/122 |
|---|---|---|---|---|---|
| 5,682,535 | A | * | 10/1997 | Knudsen | ...................... 717/117 |
| 5,897,634 | A | * | 4/1999 | Attaluri et al. | ................ 707/8 |
| 5,937,191 | A | * | 8/1999 | Graham | ...................... 717/130 |
| 6,085,035 | A | * | 7/2000 | Ungar | ........................ 717/116 |
| 6,098,064 | A | * | 8/2000 | Pirolli et al. | .................... 707/2 |
| 6,163,763 | A | * | 12/2000 | Cox et al. | ...................... 703/17 |
| 6,321,240 | B1 | * | 11/2001 | Chilimbi et al. | ............ 707/206 |
| 6,425,057 | B1 | * | 7/2002 | Cherkasova et al. | ........ 711/134 |
| 6,430,741 | B1 | * | 8/2002 | Mattson et al. | ............. 717/154 |
| 6,594,678 | B1 | * | 7/2003 | Stoutamire et al. | ......... 707/206 |
| 6,651,141 | B1 | * | 11/2003 | Adrangi | ...................... 711/118 |
| 6,700,590 | B1 | * | 3/2004 | DeMesa et al. | ............. 345/744 |
| 6,813,693 | B1 | * | 11/2004 | Chilimbi | ...................... 711/137 |
| 6,877,068 | B1 | * | 4/2005 | Blanchard | .................... 711/137 |
| 6,895,128 | B1 | * | 5/2005 | Bohnenkamp | .............. 382/305 |

FOREIGN PATENT DOCUMENTS

| JP | 08063397 | A | * | 3/1996 |
|---|---|---|---|---|
| JP | 11328010 | A | * | 11/1999 |

OTHER PUBLICATIONS

Catthoor, Francy, Dutt, Nikil, "Hot topic session: How to solve the current memory access and data transfer bottlenecks: at the processor architecture or at the compiler level?", p. 426-433, Jan. 2000, ACM, retrieved Aug. 16, 2004.*

Chee, Chye Lin; Lu, Hongjun; Tang, Hong; Ramamoorthy, CV; "Adaptive Prefetching and Storage Reorganization In A Log-Structured Storage Sstem", p. 824-838, IEEE 1998, retrieved Aug. 16, 2004.*

(Continued)

*Primary Examiner*—Wei Zhen
*Assistant Examiner*—Mary Steelman
(74) *Attorney, Agent, or Firm*—Osha Liang LLP

(57) ABSTRACT

A method for transparently optimizing data access. The method includes gathering information related to data usage when a system is processing and determining a usage pattern of the system using gathered information.

27 Claims, 3 Drawing Sheets

OTHER PUBLICATIONS

Jadav, Divyesh; Srinilta, Chutimet; Choudhary, Alok; Berra, P.Bruce; "Design and Evaluation of Data Access Strategies in a High Performance Multimedia-on-Demand Server", p. 286-291, 1995 IEEE, retrieved Aug. 16, 2004.*

Panda, PR; Catthoor, F; Dutt, ND; Danckaert, K; Brockmeyer, E; Kulkarni, C; Vandercappelle, A; Kjeldsberg, PG; "Data and Memory optimization Techniques for Embedded Systems", p. 149-206, ACM Apr. 2001, retrieved Aug. 16, 2004.*

Chapter 23; Smart Proxies; Jul. 9, 2001; pp. 1-9; Orbix 3.3; Orbix Programmer's Guide Java Edition.

M. Jeff Wislon; Get Smart With Proxies and RMI; Nov. 2000; pp. 1-17; Java World.

* cited by examiner

DYNAMIC OBJECT USAGE PATTERN LEARNING AND EFFICIENT CACHING

CROSS-REFERENCE TO RELATED APPLICATIONS

This application relates to U.S. patent application Ser. No. 09/997,927, entitled "Transparent Injection of Intelligent Proxies into Existing Distributed Applications," filed contemporaneously herewith.

BACKGROUND OF INVENTION

1. Field of the Invention

The present invention relates generally to methods for optimizing performance of distributed applications. More particularly, the present invention relates to a method for optimizing performance of a distributed application by dynamic usage pattern learning.

2. Background Art

Many distributed applications use object caches of some kind to reduce data roundtrips between the client and the server. In order for the object caching to be beneficial, the caching policy, i.e., which objects are replaced when the cache is full, which are objects are pre-fetched into the cache, and what object attributes are pre-fetched, must be efficient. It is common to find excessive amounts of data being transferred over the network and cached on the client because of overzealous data pre-fetching in false anticipation of future usage of the data. For example, if a Business Manager object has a list of immediate reports as an attribute and the naïve pre-fetching algorithm gets them all along with the Manager object, and does the same for each report. Then if there is a request for data on the CEO of a large corporation, naïve pre-fetching will result in attempting to cache every employee's profile. It is also common to find excessive number of data roundtrips between the client and the server because of indiscriminate use of fine-grained remote objects. The amount of data transferred and the number of data roundtrips between the client and the server may be reduced if pre-fetching is based on data usage patterns, since many distributed applications follow a small number of data usage patterns (relative to the amount of the data itself) repeated over many times. For example, data usage patterns in most enterprise applications are determined by business logic rules and data relationships, which are typically very small in comparison to the amount of the application data.

One of the main challenges facing many enterprises is how to enable their legacy applications to make use of more efficient techniques, such as object pre-fetching based on dynamic usage pattern learning, without having to redesign the applications or while migrating to a new architecture. Many legacy applications are designed without intent or means to facilitate learning of data usage patterns. Further, there is limited or no means for application source static analysis and re-architecture due to legal restrictions on accessing the application source code and/or the application relying on third party libraries and complex interactions with the distributed environment. Nevertheless, the effect of pre-fetching objects and attributes based on dynamic usage pattern learning can be quite beneficial to the performance of the application. Therefore, what is desired is a method for learning usage patterns dynamically in distributed applications designed without intent or means to facilitate learning of data usage patterns.

SUMMARY OF INVENTION

In one aspect, the invention relates to a method for transparently optimizing data access. The method comprises gathering information related to data usage when a system is processing and generating a usage pattern of the system using gathered information.

In one aspect, the invention relates to a method for transparently optimizing data access. The method comprises gathering information related to data usage when a system is processing, generating a usage pattern of the system using gathered information, pre-fetching data determined by the usage pattern of the system, caching data locally, accessing data by the system, and synchronizing cached data with persistent data.

In one aspect, the invention relates to a method for transparently optimizing a distributed application having a client-side and a server-side application. The method comprises gathering information related to data usage on the client-side when the distributed application is processing, and determining a usage pattern using gathered information.

In one aspect, the invention relates to a method for transparently optimizing a distributed application having a client-side and a server-side application. The method comprises gathering information related to data usage on the client-side when the distributed application is processing, determining a usage pattern using gathered information, pre-fetching data from the server-side, caching data on the client-side, accessing data on the client-side, and synchronizing cached data on the client-side with persistent data on the server-side.

In one aspect, the invention relates to a computer-readable medium having recorded thereon instructions executable by processing. There are instructions for gathering information related to data usage when a system is processing, determining a usage pattern of the system using gathered information, pre-fetching data determined by the usage pattern of the system, caching data locally, accessing data by the system, and synchronizing cached data with persistent data.

In one aspect, the invention relates to an apparatus for transparently optimizing data access. The apparatus comprises means for gathering information related to data usage when a system is processing, means for generating a usage pattern of the system using gathered information, means for pre-fetching data determined by the usage pattern of the system, means for caching data locally, accessing data by the system, and means for synchronizing cached data with persistent data.

Other features and advantages of the present invention will be apparent from the following description and the appended claims.

DETAILED DESCRIPTION

The present invention relates to a method for learning data usage patterns in a system that was designed/developed without the intent or means to facilitate learning of data usage patterns. Database applications, file server applications, etc. are examples of such systems. Further, the present invention provides a method of analyzing and instrumenting the system to intercept and monitor operations related to system components. Further the present invention relates to a method of deriving a usage pattern based on intercepting and monitoring components. Further, the present invention provides a method of using the usage pattern to optimize data transfer between different portions of the system.

Embodiments of the present invention provide a method for learning data usage patterns in existing distributed applications that are designed/developed without intent or means to facilitate learning of data usage patterns. The method of the present invention involves analyzing and instrumenting the distributed application to intercept and monitor operations related to objects on the client-side of the application. Such operations include searching for objects, creating and destroying objects, accessing attributes of objects, and modifying objects via remote calls. When the instrumented application is running, the usage pattern of the objects is derived by monitoring the client-side objects and collecting execution-related information, such as the attributes of the objects accessed and the modifications made to the objects via remote method calls. This usage pattern is used to determine a set of objects to pre-fetch and cache on the client and the attributes to preload in the objects. The optimal amount of data can be sent between the client and server by determining the cached data changed by the user and the server data changed as a result of executing a method on the server. The usage pattern learning can start from an initial access pattern based on analysis of the application code or from an empty set.

In other to fully understand the present invention, it is useful to first consider an existing distributed application that does not include a facility for learning data usage patterns and then show how the present invention enables the application to learn data usage. In the following discussion, numerous specific details are set forth to facilitate understanding of the present invention. However, it will be apparent to one of ordinary skill in the art that the present invention may be practiced without these specific details. In other instances, well-known features have not been described in detail to avoid obscuring the present invention.

Figure 1:
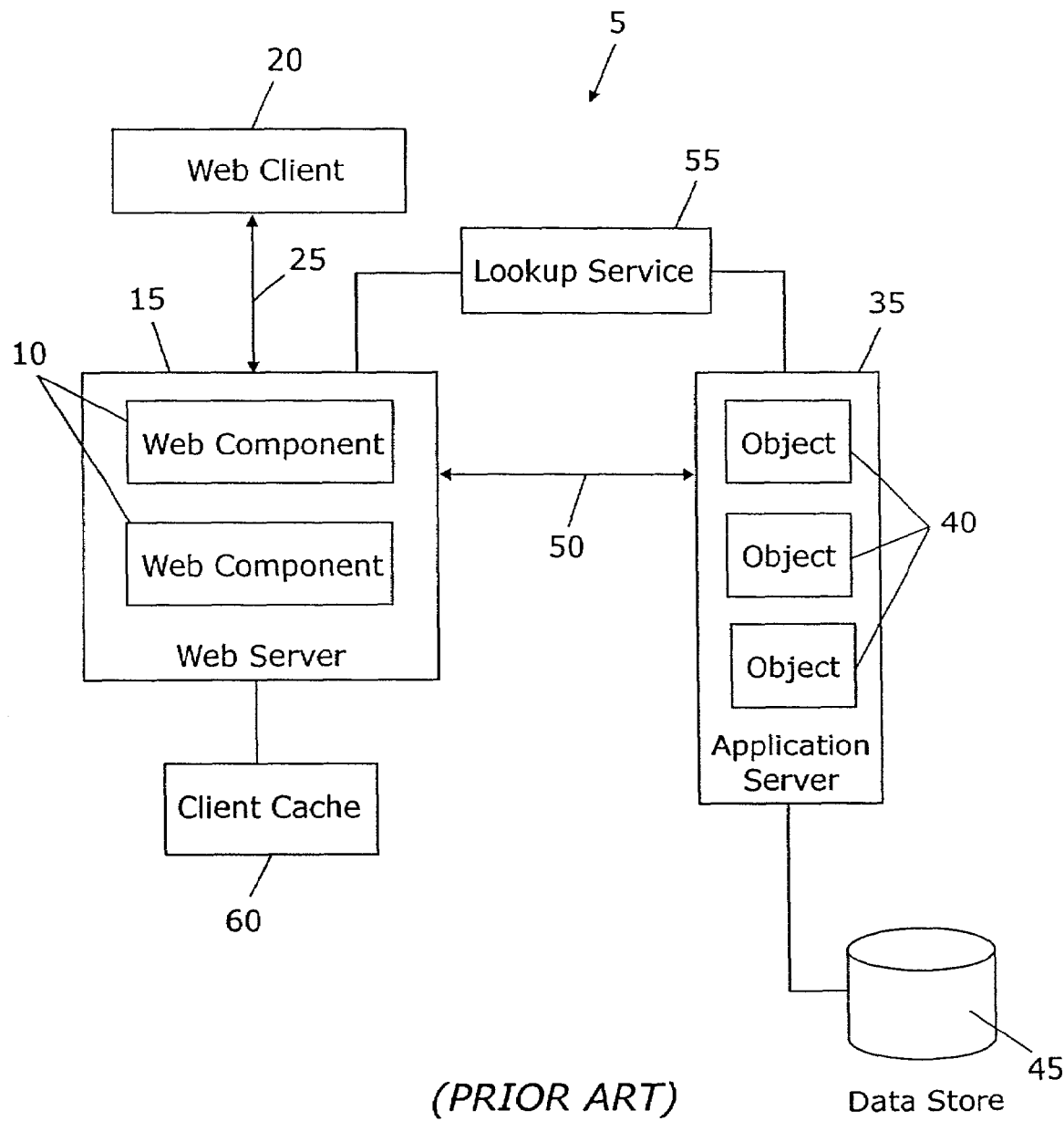
FIG. 1 is a block diagram of a distributed application in which a client application accesses application data in a data store through a server application.

FIG. 1 shows an example of a distributed system 5 that can be optimized by the present invention. For illustration purposes, it is assumed that the distributed system 5 does not include a facility for learning data usage patterns. The distributed system 5 includes a web server 15 hosting web components 10, such as JavaServer Pages (JSP) pages and Java servlets. The web components 10 contain the presentation logic that defines what a web client 20, typically a web browser, displays and how requests from the web client 20 are handled. The web client 20 and the web server 15 communicate over a network link 25. The distributed system 5 further includes an application server 35 having persistent objects 40, such as Enterprise JavaBeans (EJB) entities, that model the data held within a data store 45. The application server 35 communicates with the web components 10 over a network link 50. The persistent objects 40 can have numerous attributes and numerous methods that can be invoked by the web components 10 in order to manipulate data stored within the data store 45.

Figure 2:
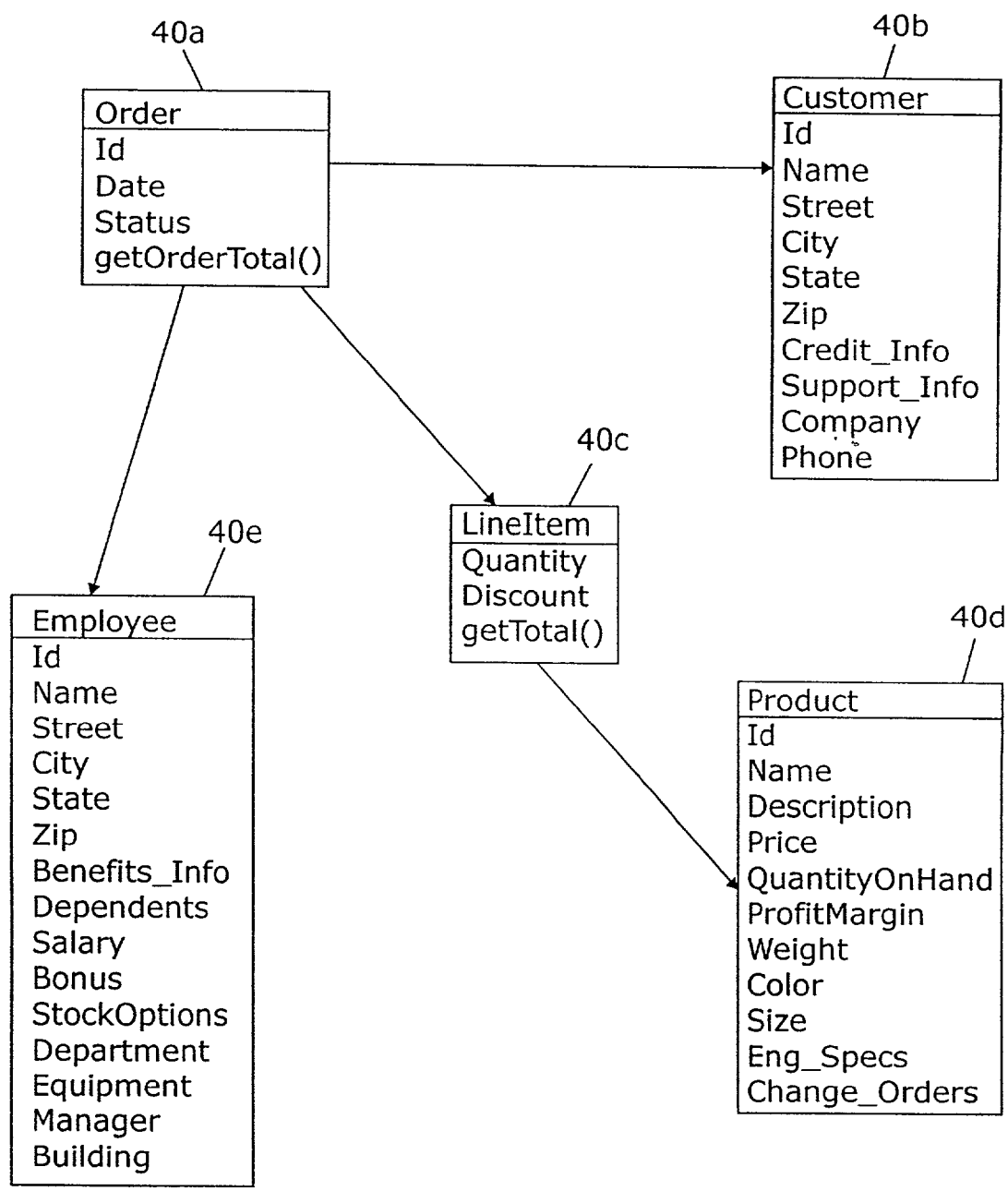
FIG. 2 is an exemplary set of objects, some of which include methods, to be accessed by the client application of FIG. 1.

FIG. 2 shows a representative collection of the persistent objects (40 in FIG. 1) in the application server (35 in FIG. 1). The collection of objects includes an Order object 40a, a Customer object 40b, a Line Item object 40c, a Product object 40d, and an Employee object 40e. The Order object 40a represents a sales order. The Customer object 40b holds information regarding the customer that placed the order, such as first name, last name, billing address, and credit card number. The Line Item object 40c identifies particular items in the sales order. The Product object 40d holds information regarding the ordered item. The Employee object 40e holds information regarding the employee that accepted the order. In the figure, the relationships between the objects are represented by arrows. Each of the objects 40a, 40b, 40c, 40d, 40e can have numerous attributes and methods. As an example, the Order object 40a has three attributes: id, date, and status. The Order object 40a also includes a method getorderTotal ( ), which retrieves the total cost of the order.

Returning to FIG. 1, the web components 10 use remote calls to access and invoke methods on the persistent objects 40. As an example, if the persistent object 40 is an EJB entity, web component 15 first acquires a home interface for the EJB entity from a lookup service 55. The web component 15 then uses the home interface to create or find an instance of the EJB entity. The web component 15 can use the home interface to execute methods on the EJB entity instance, get a reference to the EJB entity instance, and remove the EJB entity instance. The distributed system 5 includes a cache 60 on the web server 15 for holding the accessed on the application server 35. The objects are cached as proxy objects that can be locally accessed by the web components 10.

In operation, pages are displayed on the web client 20 using selected attributes from selected objects. For example, one page may display names of customers only (using Customer object) and allow a user to select a button to display orders associated with a specific customer. Another page may display orders associated with a specific customer (using Order and Customer objects) and allow a user to select a button to display details about a specific order. Another page may display details about a specific order (using Order, Line Item, Product, Customer, and Employee objects) and allow the user to make changes to the order. In order to generate each of these pages, the required objects must either be present in the client cache 60 or fetched from the application server 35. If the object usage pattern is known, then the optimal amount of data can be pre-fetched from the application server 35 before each page is generated. The object usage pattern would include information about what objects and attributes are needed to generate each page.

Figure 3:
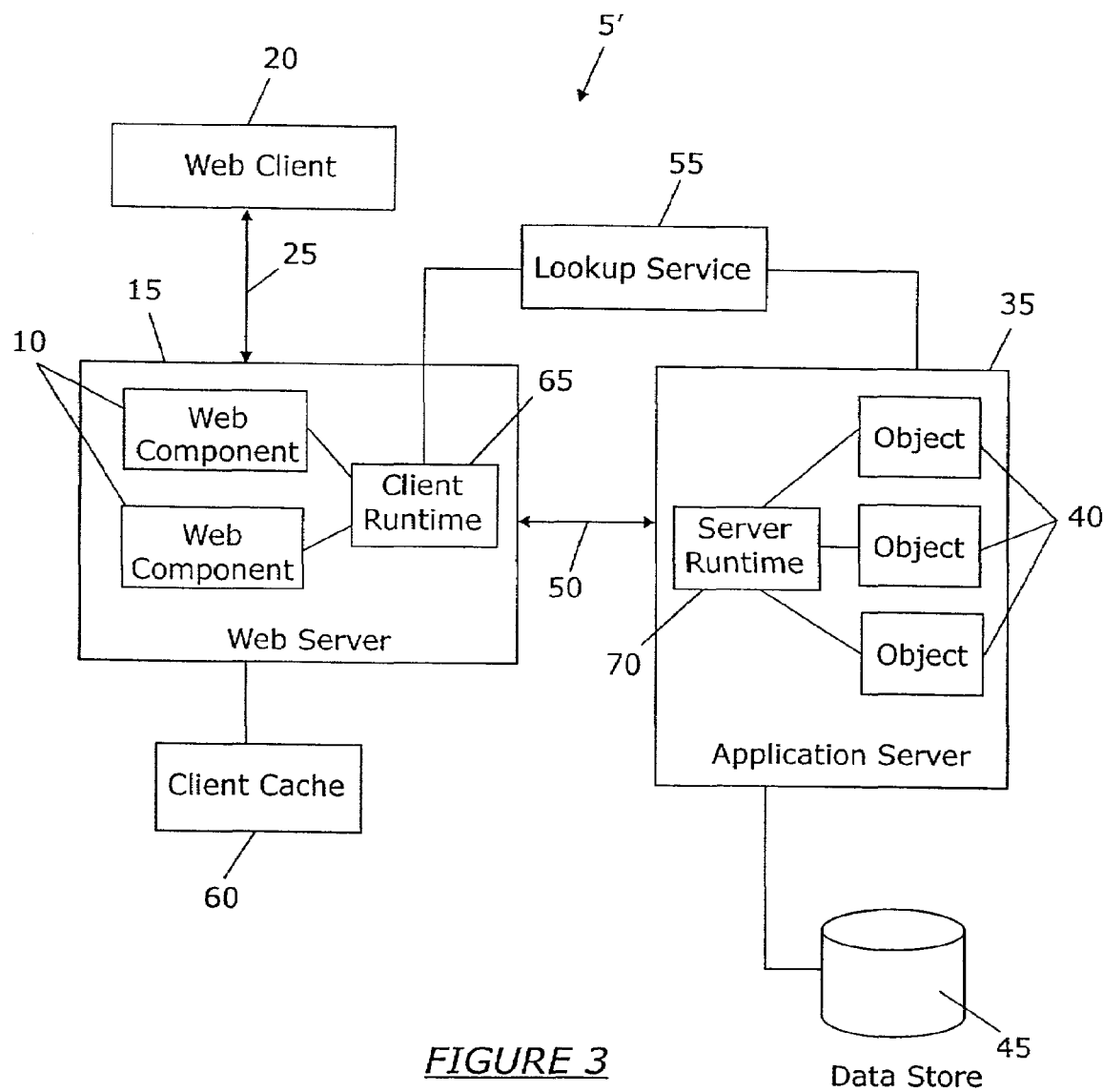
FIG. 3 shows an optimized version of the distributed application of FIG. 1 in accordance with one embodiment of the present invention.

In accordance with one embodiment of the present invention, the distributed system 5 is instrumented to intercept calls to the lookup service 55, calls to create, find, and destroy object instances, calls to access attributes of objects, and remote calls to modify objects. FIG. 3 shows the distributed system 5 after instrumentation. As shown, a client runtime 65 is interposed between the web components 10 and the application server 35 to intercept all the calls listed above in order to gather information about object usage. The web components 10 are modified such that calls that were originally made to the application server 35 and lookup service 55 now go to the client runtime 65. Typically, the process of modifying the web components 10 involves parsing the machine code (bytecode) or source code for the web components 10 and replacing all the calls listed above with calls to the client runtime 65. So, for example, calls to the lookup service 55 are replaced with calls to a lookup service included in the client runtime 65. This allows the client runtime 65 to collect information about the object that the web component is trying to locate.

When the instrumented application is running, the application transitions from one state to another in response to user gestures. As the application transitions from one state to another, the client runtime 65 monitors object usage on the client-side, collects execution related information, and derives object usage patterns. The object usage patterns are then used to determine a set of objects and attributes to pre-fetch and store in the client cache 60. The objects and attributes can be pre-fetched based on a number of criteria. For example, the decision can be based on application-dependent positions such as the URL of web server pages or application stack trace at points where objects are created and/or modified and/or destroyed. The decision can also be based on object type, object attribute access statistics, size of object or its individual attributes. Other criteria include similarity in usage patterns of attributes of the same or different objects, size of the data sent between the client and the server in each roundtrip or a set of roundtrips within a time window, the structure of the object graph sent from the server to the client, the place of the object in the object graph sent between the server and the client, network saturation and/or load-balancing information, and user hints.

The application can start with an initial usage pattern derived from application code analysis or from an empty set. As the web client 20 sends requests to the web server 15 via 25, and the web components 10 process the requests, the objects requested, created, modified, and destroyed by the web components 10 are monitored. Also, all the attributes accessed and all the remote calls made are monitored. This allows a graph of objects and attributes to be constructed. If learning is based on URL, for example, a graph of objects and attributes per URL is constructed. The next time the URL is accessed, objects and attributes are pre-fetched from the application server 35 according to graph of objects and attributes for that URL. The client runtime 65 sends the list of objects and attributes to be pre-fetched to a server runtime 70 that actually retrieves the data.

The server runtime 70 coordinates synchronization of the client cache 60 with the persistent objects 40. In order to reduce the number of client-server roundtrips, the client cache 60 is synchronized after each remote method call based on the history of the client-side (proxy) objects modified by the previous method invocations and/or user hints. For each data roundtrip, the optimal amount of data to send from the web server 15 to the application server 35 is determined. This optimal amount of data is based on the attributes of the cached objects changed by the user. Also, the optimal amount of data to be sent from the application server 35 to the web server 15 is determined. This optimal amount of data is based on the attributes of the cached objects changed by the user or application business logic.

The present invention provides general advantages in that an application that does not originally include a facility for learning data usage pattern can be instrumented to learn data usage pattern. The learned data usage pattern can be used advantageously to determine the optimal amount of data to transfer between the client and server, reducing network traffic and memory space used by the client cache. The present invention can also facilitate the development and optimization of business process models, and system test frameworks. The optimization can be done transparently, i.e., without changing the application semantic.

While the present invention has been described with respect to a limited number of embodiments, those skilled in the art, having benefit of this disclosure, will appreciate that other embodiments can be devised which do not depart from the scope of the present invention as disclosed herein. Accordingly, the scope of the present invention should be limited only by the attached claims.

What is claimed is:

1. A method for transparently optimizing data access, comprising:
   gathering information related to data usage when a system is processing using a client runtime; and
   determining a usage pattern of the system using gathered information,
   wherein the usage pattern specifies a plurality of persistent objects and an attribute for each of the plurality of persistent objects for a web page,
   wherein the attribute corresponds to content associated with the web page that is requested by the client runtime, and
   wherein the plurality of objects is organized as an object graph.

2. The method of claim 1, further comprising:
   pre-fetching the plurality of persistent objects and the attribute for each of the plurality of persistent objects for the web page, as specified in the usage pattern of the system;
   caching the plurality of persistent objects and the attributes for each of the plurality of persistent objects for the web page locally in a cache associated with the system;
   accessing the plurality of persistent objects and the attributes for each of the plurality of persistent objects for the web page from the cache; and
   synchronizing the cache with a persistent data store, wherein the persistent data store stores the plurality of persistent objects.

3. The method of claim 1, further comprising:
   generating a description of a business process model by retaining the usage pattern over a period of at least one execution of the system.

4. The method of claim 1, further comprising:
   generating tests for the system by retaining the usage pattern over a period of at least one execution of the system.

5. The method of claim 1, wherein the usage pattern comprises pieces of information used together based on a relationship.

6. The method of claim 5, wherein the relationship is temporal.

7. The method of claim 5, wherein the relationship is causal.

8. The method of claim 1, further comprising:
   deriving an initial usage pattern from application code analysis.

9. The method of claim 1, further comprising:
   deriving an initial usage pattern from an empty set.

10. The method of claim 1, further comprising:
    deriving an initial usage pattern from a specification of the system.

11. The method of claim 1, further comprising:
    displaying the plurality of persistent objects and the attributes for each of the plurality of persistent objects for the web page specified in the usage pattern on a display device.

12. The method of claim 1, further comprising:
generating documentation from the usage pattern.

13. A method for transparently optimizing data access, comprising:
gathering information related to data usage when a system is processing using a client runtime;
determining a usage pattern of the system using gathered information, wherein the usage pattern specifies a plurality of persistent objects and an attribute for each of the plurality of persistent objects for a web page, wherein the attribute corresponds to content associated with the web page that is requested by the client runtime, and wherein the plurality of objects is organized as an object graph;
pre-fetching the plurality of persistent objects and the attribute for each of the plurality of persistent objects for the web page, as specified in the usage pattern of the system;
caching the plurality of persistent objects and the attributes for each of the plurality of persistent objects for the web page locally in a cache associated with the system;
accessing the plurality of persistent objects and the attributes for each of the plurality of persistent objects for the web page from the cache; and
synchronizing the cache with a persistent data store, wherein the persistent data store stores the plurality of persistent objects.

14. A method for transparently optimizing a distributed application having a client-side and a server-side, comprising:
gathering information related to data usage on the client-side when the distributed application is processing using a client runtime; and
determining a usage pattern using gathered information,
wherein the usage pattern specifies a plurality of persistent objects and an attribute for each of the plurality of persistent objects for a web page reqested by the client-side,
wherein the attribute corresponds to content associated with the web page that is requested by the client runtime, and
wherein the plurality of objects is organized as an object graph.

15. The method of claim 14, further comprising:
pre-fetching the plurality of persistent objects and the attribute for each of the plurality of persistent objects for the web page, from the server-side using the usage pattern and a server runtime;
caching the plurality of persistent objects and the attributes for each of the plurality of persistent objects for the web page in a cache associated with the client-side;
accessing the plurality of persistent objects and the attributes for each of the plurality of persistent objects for the web page on the client-side using the cache; and
synchronizing the cache on the client-side with a persistent data store on the server-side, wherein the persistent data store stores the plurality of persistent objects.

16. The method of claim 14, wherein the usage pattern comprises pieces of information used together based on a relationship.

17. The method of claim 16, wherein the relationship is temporal.

18. The method of claim 16, wherein the relationship is causal.

19. The method of claim 14, wherein the data represents objects.

20. The method of claim 14, further comprising:
deriving an initial usage pattern from application code analysis.

21. The method of claim 14, further comprising:
deriving an initial usage pattern from an empty set.

22. The method of claim 14, further comprising:
deriving an initial usage pattern from a specification of the system.

23. The method of claim 14, further comprising:
displaying the plurality of persistent objects and the attributes for each of the plurality of persistent objects for the web page specified in the usage pattern on a display device.

24. The method of claim 14, further comprising:
generating documentation from the usage pattern.

25. A method for transparently optimizing a distributed application having a client-side and a server-side, comprising:
gathering information related to data usage on the client-side when the distributed application is processing using a client runtime;
determining a usage pattern using gathered information, wherein the usage pattern specifies a plurality of persistent objects and an attribute for each of the plurality of persistent objects for a web page requested by the client-side, wherein the attribute corresponds to content associated with the web page that is requested by the client runtime, and wherein the plurality of objects is organized as an object graph;
pre-fetching the plurality of persistent objects and the attribute for each of the plurality of persistent objects for the web page, from the server-side using the usage pattern and a server runtime;
caching the plurality of persistent objects and the attributes for each of the plurality of persistent objects for the web page in a cache associated with the client-side;
accessing the plurality of persistent objects and the attributes for each of the plurality of persistent objects for the web page on the client-side using the cache; and
synchronizing the cache on the client-side with the persistent data store on the server-side, wherein the persistent data store stores the plurality of persistent objects.

26. A computer-readable medium having recorded thereon instructions executable by processing, the instructions for:
gathering information related to data usage when a system is processing using a client runtime;
determining a usage pattern of the system using gathered information, wherein the usage pattern specifies a plurality of persistent objects and an attribute for each of the plurality of persistent objects for a web page, wherein the attribute corresponds to content associated with the web page that is requested by the client runtime, and wherein the plurality of objects is organized as an object graph;
pre-fetching the plurality of persistent objects and the attribute for each of the plurality of persistent objects for the web page, as specified in the usage pattern of the system;
caching the plurality of persistent objects and the attributes for each of the plurality of persistent objects for the web page locally in a cache associated with the system;

accessing the plurality of persistent objects and the attributes for each of the plurality of persistent objects for the web page from the cache; and synchronizing the cache with a persistent data store, wherein the persistent data store stores the plurality of persistent objects.

27. An apparatus for transparently optimizing data access, comprising:

means for gathering information related to data usage when a system is processing using a client runtime;

means for determining a usage pattern of the system using gathered information, wherein the usage pattern specifies a plurality of persistent objects and an attribute for each of the plurality of persistent objects for a web page, wherein the attribute corresponds to content associated with the web page that is requested by the client runtime, and wherein the plurality of objects is organized as an object graph;

means for pre-fetching the plurality of persistent objects and the attribute for each of the plurality of persistent objects for the web page, as specified in the usage pattern of the system;

means for caching the plurality of persistent objects and the attributes for each of the plurality of persistent objects for the web page locally in a cache associated with the system;

means for accessing the plurality of persistent objects and the attributes for each of the plurality of persistent objects for the web page from the cache; and means for synchronizing the cache with a persistent data store, wherein the persistent data store stores the plurality of persistent objects.

* * * * *